United States Patent
Arriola et al.

(10) Patent No.: US 11,831,823 B2
(45) Date of Patent: Nov. 28, 2023

(54) SCHEDULE COORDINATION SYSTEM THAT PERFORMS PREDETERMINED PROCESS NECESSARY FOR EXECUTING TASK, WHEN CURRENT DATE AND TIME HAS REACHED PREDETERMINED DATE AND TIME OF STARTUP, AND MULTIFUNCTION PERIPHERAL

(71) Applicant: KYOCERA Document Solutions Inc., Osaka (JP)

(72) Inventors: Dennis Arriola, Osaka (JP); Rowel Orbaneja, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 8 days.

(21) Appl. No.: 17/850,533

(22) Filed: Jun. 27, 2022

(65) Prior Publication Data
US 2023/0007133 A1    Jan. 5, 2023

(30) Foreign Application Priority Data

Jul. 2, 2021 (JP) .................................. 2021-110832

(51) Int. Cl.
*H04N 1/00* (2006.01)
*G06F 3/12* (2006.01)

(52) U.S. Cl.
CPC ....... *H04N 1/00344* (2013.01); *G06F 3/1205* (2013.01); *G06F 3/126* (2013.01); *H04N 1/00204* (2013.01); *H04N 1/00408* (2013.01); *H04N 1/00477* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,665,459 B2 * | 3/2014 | Tsujimoto | .......... H04N 1/00344 358/1.13 |
| 2012/0062938 A1 * | 3/2012 | Tajima | .................. G06F 3/1271 358/1.15 |

(Continued)

FOREIGN PATENT DOCUMENTS

| | | |
|---|---|---|
| JP | 2015220704 A | 12/2015 |
| JP | 2015231716 A | 12/2015 |

*Primary Examiner* — Henok Shiferaw

(57) ABSTRACT

A schedule coordination system includes a multifunction peripheral and an information processing apparatus. The multifunction peripheral includes a first communication I/F, a storage device in which schedule information indicating a task and a date and time of execution is stored, and a first control device that acts as a task scheduler that decides whether a current date and time has reached a predetermined date and time of startup, on a basis of the schedule information, and performs, upon deciding that the current date and time has reached the date and time of startup, a predetermined process necessary for executing the task indicated by the schedule information, and a controller that executes the task. The information processing apparatus includes a second communication I/F and a second control device that acts as an executor that executes an operation according to a command transmitted from the task scheduler.

5 Claims, 11 Drawing Sheets

(56) References Cited

U.S. PATENT DOCUMENTS

| | | | | |
|---|---|---|---|---|
| 2013/0215450 | A1* | 8/2013 | Hatano | H04L 41/0833 |
| | | | | 358/1.14 |
| 2015/0286446 | A1* | 10/2015 | Nuggehalli | G06F 3/1267 |
| | | | | 358/1.15 |
| 2017/0201637 | A1* | 7/2017 | Okuma | H04N 1/00477 |
| 2019/0020770 | A1* | 1/2019 | Araki | G06F 3/1204 |
| 2019/0050187 | A1* | 2/2019 | Nakazawa | G06F 11/30 |
| 2020/0195793 | A1* | 6/2020 | Tajima | H04N 1/00204 |

* cited by examiner

| REFERENCE NUMBER | TASK | | | DATE AND TIME OF EXECUTION |
|---|---|---|---|---|
| | TYPE | DETAIL | | |
| 0214 | PRINTING TASK | STORAGE LOCATION OF DOCUMENT PRINT SETTING (B/W, A4 SIZE) | | 20210625080 0 |
| 0215 | SCANNING TASK | NAME OF DOCUMENT CONTACT ADDRESS FOR NOTIFYING SCANNING IS READY | | 20210628142 0 |
| 0216 | TRANSFER TASK | STORAGE LOCATION OF DOCUMENT TRANSFER DESTINATION OF DOCUMENT | | 20210624113 0 |

SCHEDULE COORDINATION SYSTEM THAT PERFORMS PREDETERMINED PROCESS NECESSARY FOR EXECUTING TASK, WHEN CURRENT DATE AND TIME HAS REACHED PREDETERMINED DATE AND TIME OF STARTUP, AND MULTIFUNCTION PERIPHERAL

INCORPORATION BY REFERENCE

This application claims priority to Japanese Patent Application No. 2021-110832 filed on Jul. 2, 2021, the entire contents of which are incorporated by reference herein.

BACKGROUND

The present disclosure relates to a technique to manage a schedule, with respect to a task to be executed by an information processing apparatus such as a personal computer.

Electronic apparatuses having a function to schedule various jobs are generally known. For example, a first technique to manage the schedule of print jobs is known. In addition, a second technique to manage the schedule (scheduled execution time) of facsimile transmission jobs is also known.

SUMMARY

The disclosure proposes further improvement of the foregoing techniques.

In an aspect, the disclosure provides a schedule coordination system including a multifunction peripheral and an information processing apparatus. The multifunction peripheral includes a first communication interface (I/F), a storage device, and a first control device. The first communication I/F communicates with the information processing apparatus via a network. In the storage device, schedule information indicating a task designated by a user, and a date and time that the task is to be executed, is stored. The first control device includes a processor, and acts as a task scheduler and a controller, when the processor executes a control program. The task scheduler decides whether a current date and time has reached a predetermined date and time of startup, on a basis of the schedule information stored in the storage device, and performs, upon deciding that the current date and time has reached the date and time of startup, a predetermined process necessary for executing the task indicated by the schedule information. The controller executes the task indicated by the schedule information. The information processing apparatus includes a second communication I/F and a second control device. The second communication I/F communicates with the multifunction peripheral, via the network. The second control device includes a processor, and acts as an executor when the processor executes a control program. The executor executes an operation according to a command transmitted from the task scheduler via the first communication I/F.

In another aspect, the disclosure provides a multifunction peripheral including a first communication I/F, a storage device, and a first control device. The first communication I/F communicates, via a network, with an information processing apparatus that executes an operation according to a command transmitted from the multifunction peripheral. In the storage device, schedule information indicating a task designated by a user, and a date and time that the task is to be executed, is stored. The first control device includes a processor, and acts as a task scheduler and a controller, when the processor executes a control program. The task scheduler decides whether a current date and time has reached a predetermined date and time of startup, on a basis of the schedule information stored in the storage device, and performs, upon deciding that the current date and time has reached the date and time of startup, a predetermined process necessary for executing the task indicated by the schedule information. The controller executes the task indicated by the schedule information.

DETAILED DESCRIPTION

Figure 1:
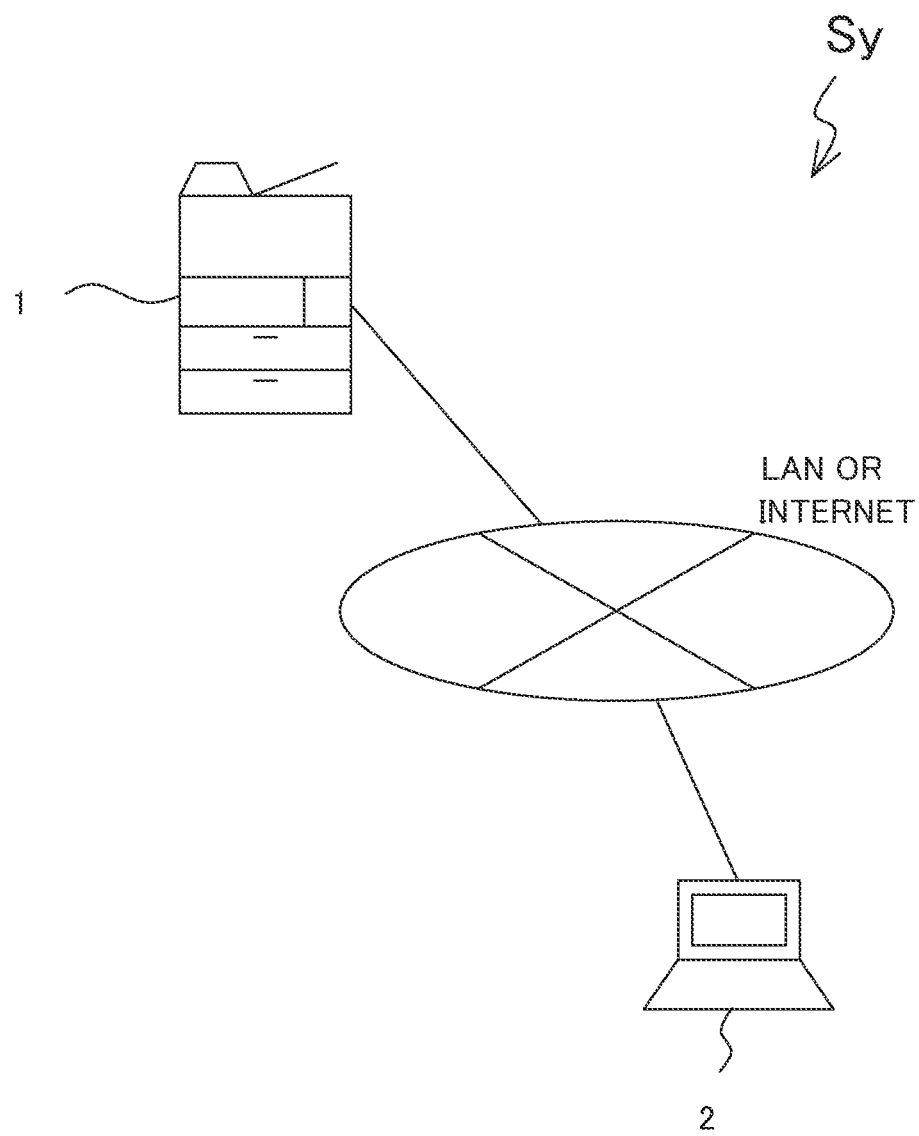
FIG. 1 is a schematic diagram showing a general configuration of a schedule coordination system according to an embodiment of the disclosure.

Hereafter, a schedule coordination system and a multifunction peripheral according to an embodiment of the disclosure will be described, with reference to the drawings. FIG. 1 illustrates a general configuration of the schedule coordination system Sy according to the embodiment of the disclosure.

The schedule coordination system Sy includes an image forming apparatus 1 and an information processing apparatus 2, located on a network such as the internet. The image forming apparatus 1 is a multifunction peripheral having a plurality of functions, such as copying, printing, scanning, and facsimile transmission. The image forming apparatus 1 exemplifies the multifunction peripheral in the disclosure.

The information processing apparatus 2 is, for example, a personal computer. The information processing apparatus 2 is configured to convert a document to be printed into data that can be analyzed by the image forming apparatus 1, thereby generating print data, and transmit the print data to the image forming apparatus 1 thereby requesting the image forming apparatus 1 to print the document.

Figure 2:
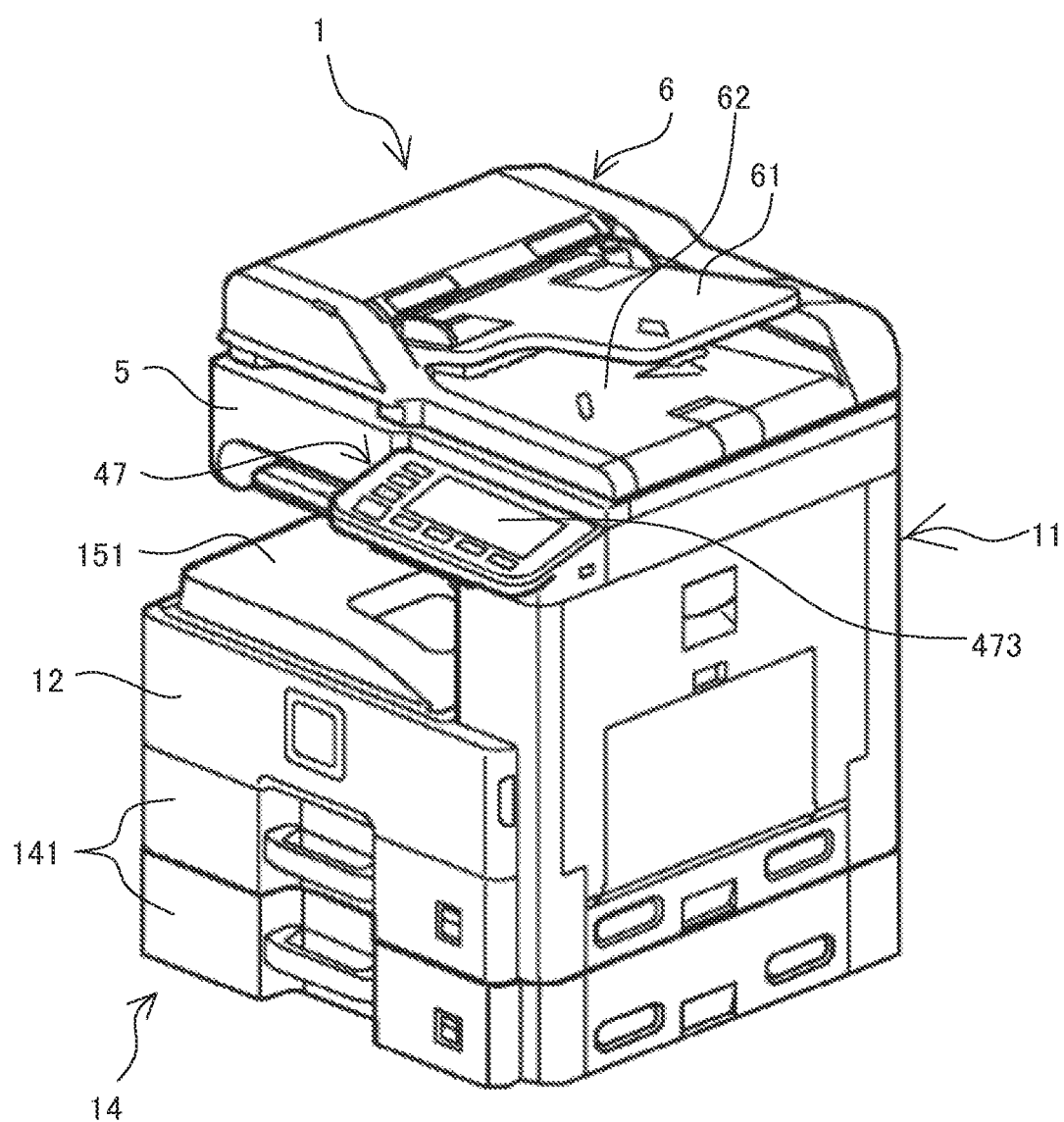
FIG. 2 is a perspective view showing the appearance of an image forming apparatus.
Figure 3:
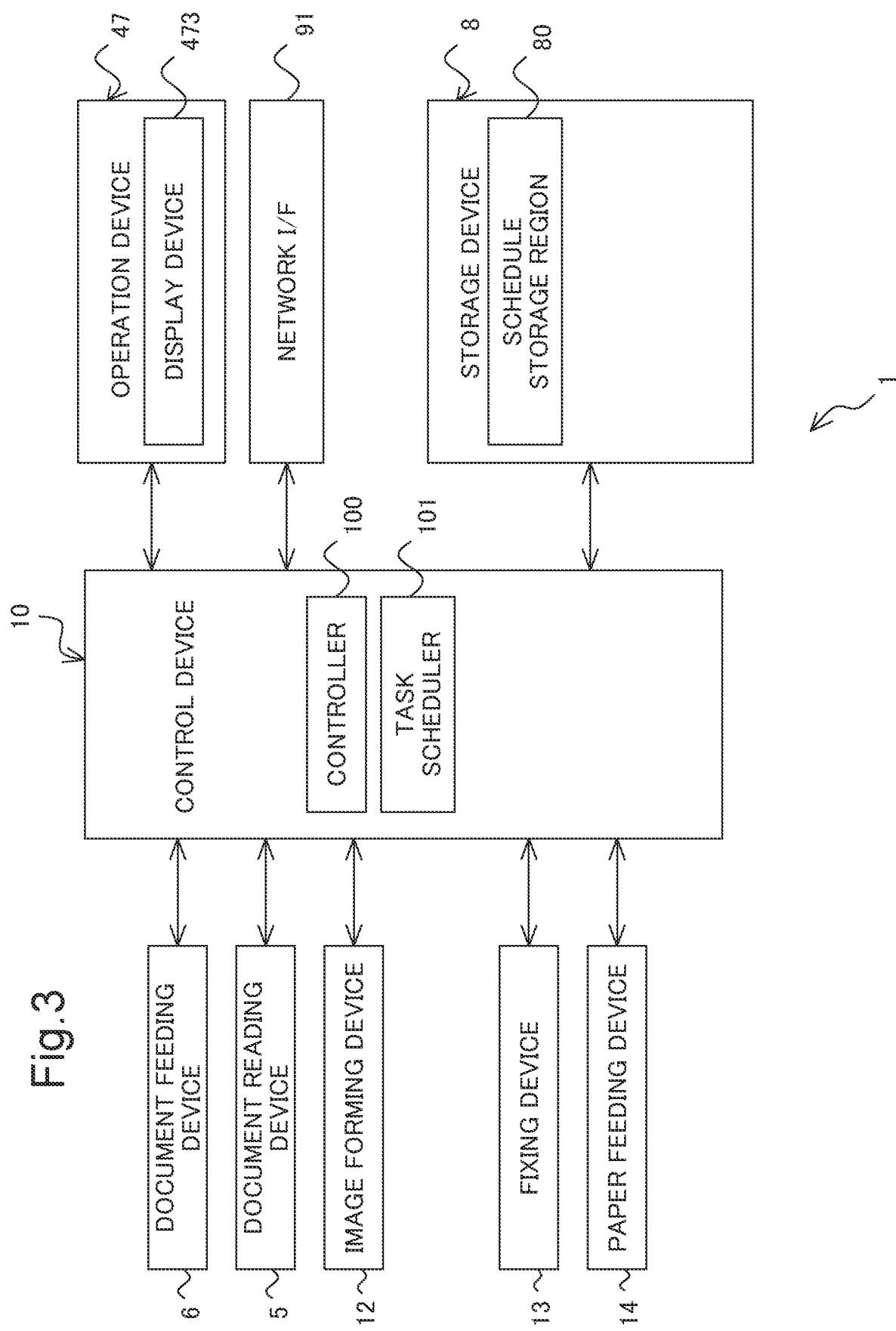
FIG. 3 is a functional block diagram showing an essential internal configuration of the image forming apparatus.

FIG. 2 is a perspective view showing the appearance of the image forming apparatus 1. FIG. 3 is a functional block diagram showing an essential internal configuration of the image forming apparatus 1. The image forming apparatus 1 includes a control device 10, a document feeding device 6, a document reading device 5, an image forming device 12, a fixing device 13, a paper feeding device 14, an operation device 47, a network interface (I/F) 91, and a storage device 8, which are provided in or on a main body 11.

The document feeding device 6 is openably connected to the upper face of the document reading device 5, for example via a hinge. The document feeding device 6 serves as a document retention cover, when the document reading device 5 reads a source document placed on the platen glass. The document feeding device 6 is configured as an automatic document feeder (ADF) or a document processor (DP). The document feeding device 6 includes a document tray 61, and delivers the source documents placed thereon one by one, to the document reading device 5, and discharges the source documents, the image on which has been read by the document reading device 5, to a document discharge table 62.

To perform the image forming operation, the image forming apparatus 1 operates as follows. The image forming device 12 forms a toner image on a recording sheet, serving as a recording medium, and delivered from the paper feeding device 14, on the basis of the image data generated through the document reading operation, the image data stored in the image memory, or image data received from a computer (e.g., the information processing apparatus 2) connected via a network.

The fixing device 13 heats and presses the recording sheet on which the toner image has been formed by the image forming device 12, to thereby fix the toner image on the recording sheet. The recording sheet that has undergone the fixing process is delivered to an output tray 151. The paper feeding device 14 includes a plurality of paper cassettes 141.

The operation device 47 receives instructions from the user to execute the functions and operations that the image forming apparatus 1 is configured to perform, such as the image forming operation. The operation device 47 includes a display device 473 for displaying, for example, an operation guide for the user. The operation device 47 receives, through the touch panel provided on the display device 473, the user's instruction based on the touch operation performed by the user on the operation screen displayed on the display device 473, or on a physical key.

The display device 473 includes, for example, a liquid crystal display (LCD). The display device 473 includes the touch panel. When the user touches a button or a key displayed on the screen, the touch panel detects the instruction corresponding to the touched position.

The network I/F 91 is a communication interface that transmits and receives various types of data to and from an external device (e.g., the information processing apparatus 2) inside a local area, or on the internet.

The storage device 8 is a large-capacity storage device such as a hard disk drive (HDD) and a solid-state drive (SSD). The storage device 8 contains various control programs, and includes a schedule storage region 80. In the schedule storage region 80, schedule information indicating a task designated by the user (e.g., printing task, scanning task, or transfer task), and date and time that the task is to be executed.

Figure 4:
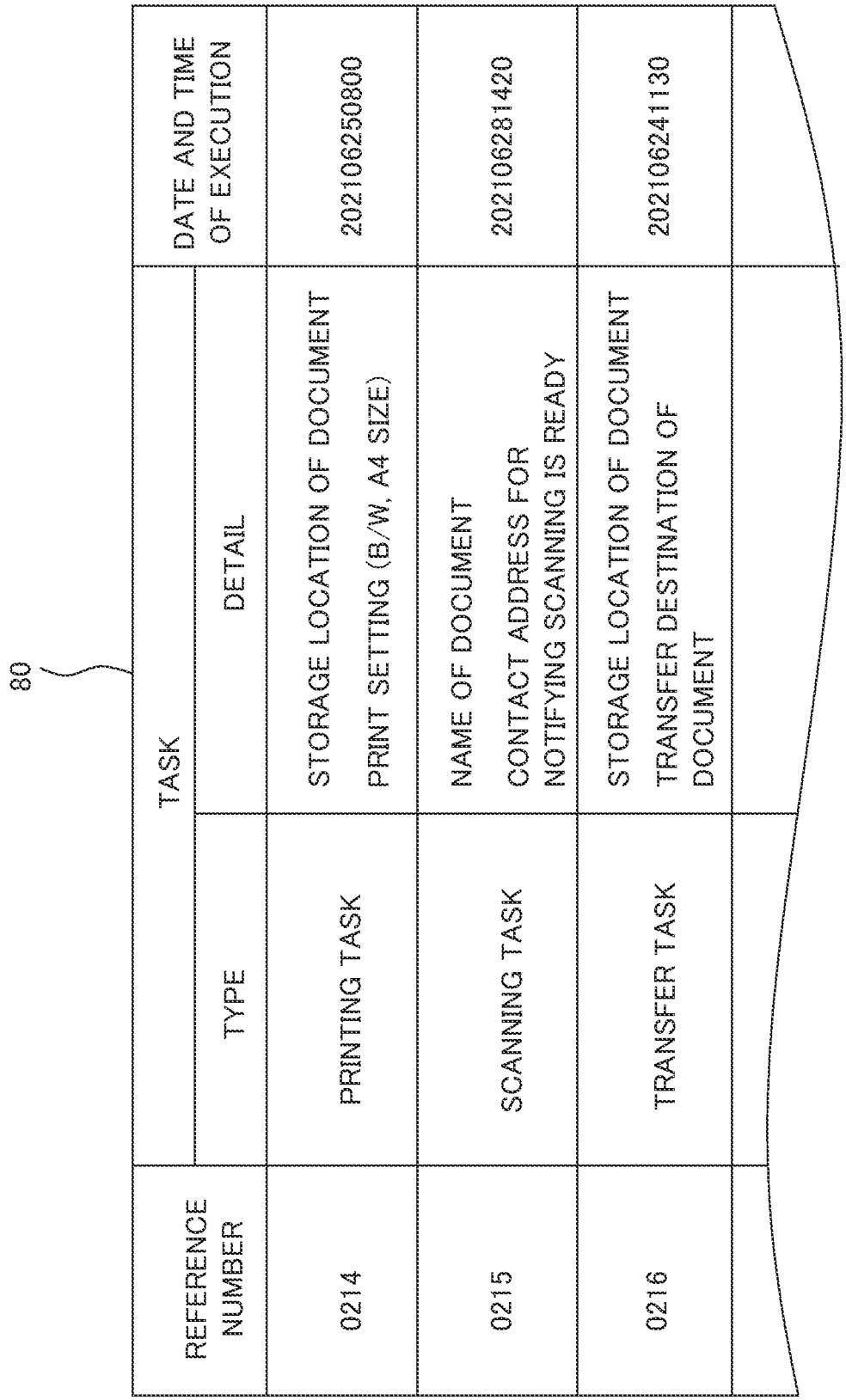
FIG. 4 is a table showing an example of data structure stored in a schedule storage region.

FIG. 4 is a table showing an example of a data structure stored in the schedule storage region 80. In the schedule storage region 80, the information including the task information and the date and time of execution is stored, in association with a reference number assigned to each piece of the schedule information. The task information includes the type of the task and detail information. The controller 100 registers the schedule information designated by the user in the schedule storage region 80, according to the user's instruction inputted through the operation device 47.

The printing task is the task of printing the document stored in the information processing apparatus 2. In the schedule storage region 80, the storage location of the document to be printed, and print settings (e.g., color or B/W, paper size, simplex or duplex printing) are stored as the detail information of the printing task. The storage location of the document may be indicated, for example, by a file path.

The scanning task is the task of causing the document reading device 5 to read a document. In the schedule storage region 80, the name of the document to be scanned (to be read), and the contact address for notifying that the time for scanning the document is drawing near (contact address for notifying that the scanning is ready), are stored as the detail information about the scanning task. The contact address can be exemplified by an e-mail address.

The transfer task is the task for transferring the document stored in the information processing apparatus 2, to a predetermined transfer destination. In the schedule storage region 80, the storage location of the document to be transferred, and the transfer destination of the document are stored as the detail information of the transfer task. The transfer destination of the document can be exemplified by an e-mail address.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU).

The control device 10 acts as a controller 100 and a task scheduler 101, when the processor operates according to a control program stored in the storage device 7. Here, the controller 100 and the task scheduler 101 may be constituted in the form of a hardware circuit, instead of being realized by the operation of the control device 10 according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the paper feeding device 14, the operation device 47, the network I/F 91, and the storage device 8, and controls the operation of the mentioned components. For example, the controller 100 analyzes the print data transmitted from the information processing apparatus 2, thereby generating bitmap data, and causes the image forming device 12 to perform the printing operation based on the bitmap generated as above. The print data transmitted from the information processing apparatus 2 is the data described in the page description language (PDL) that can be analyzed by the image forming apparatus 1.

The task scheduler 101 decides whether the date and time of startup, for performing a predetermined process, necessary for executing the task indicated by the schedule information, has been reached, on the basis of the schedule information stored in the schedule storage region 80, and performs the predetermined process, in the case of deciding that the date and time of startup has been reached.

In the case of the printing task, the task scheduler 101 decides that the date and time of startup has been reached, when the date and time for executing the printing task has been reached, and transmits, as the predetermined process, the printing command and the storage location information indicating the storage location of the document to be printed (with the print setting information, as the case may be), to the information processing apparatus 2.

In the case of the scanning task, the task scheduler 101 decides that the date and time of startup has been reached, when the time a predetermined time (e.g., 15 minutes) before the date and time for executing the scanning task has been reached, and notifies, as the predetermined process, the user to the effect that the time for executing the scanning is drawing near.

In the case of the transfer task, the task scheduler 101 decides that the date and time of startup has been reached, when the date and time for executing the transfer task has been reached, and transmits, as the predetermined process, the transfer command and the storage location information indicating the storage location of the document to be transferred, to the information processing apparatus 2.

Figure 5:
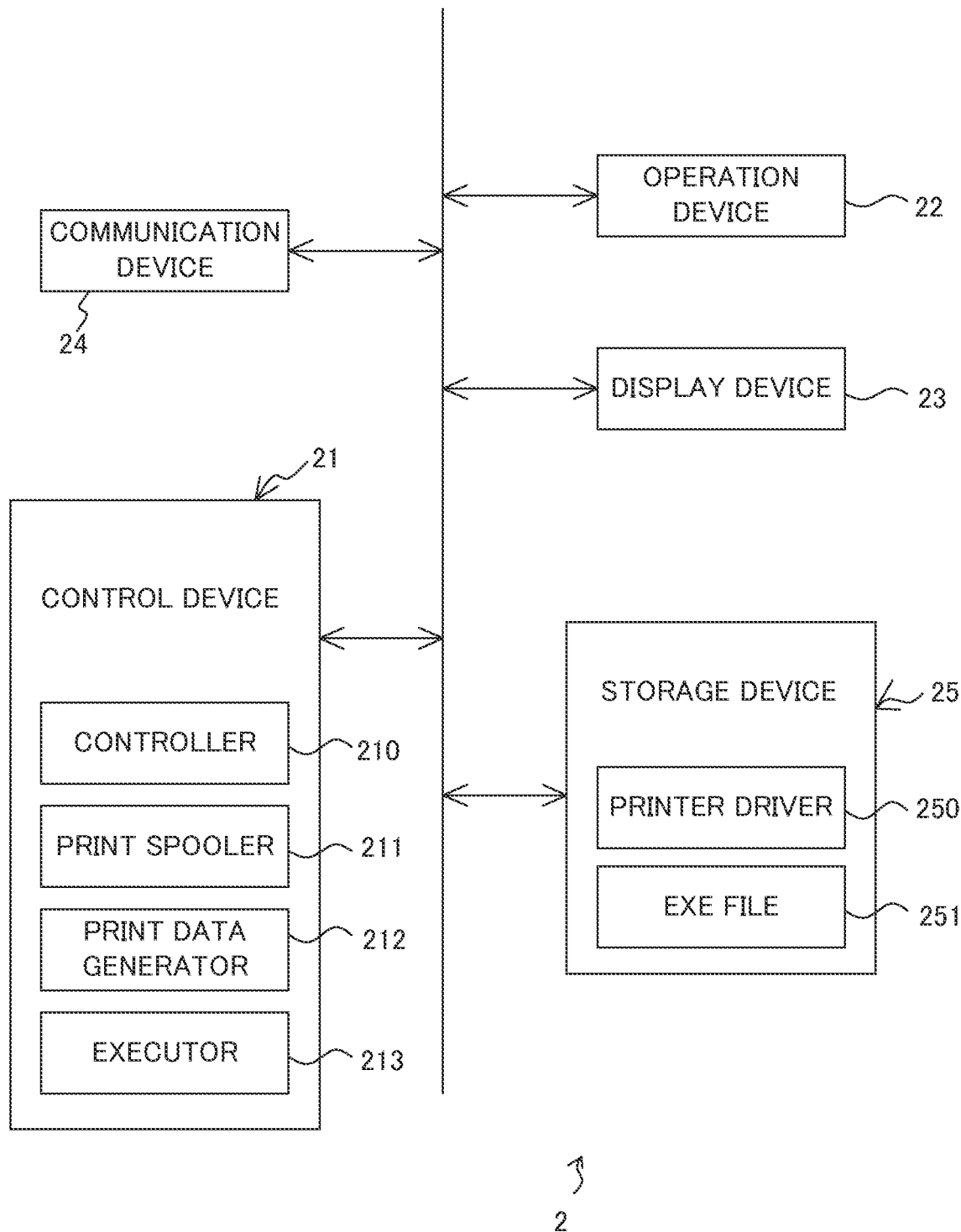
FIG. 5 is a functional block diagram showing an essential internal configuration of an information processing apparatus.

FIG. 5 is a functional block diagram showing an essential internal configuration of the information processing apparatus 2. The information processing apparatus 2 includes a control device 21, an operation device 22, a display device 23, a communication device 24, and a storage device 25. The mentioned components can transmit and receive data and signals, to and from each other, via a communication bus.

The operation device 22 includes a keyboard, a mouse, and so forth. The operation device 22 receives the input of the user's instruction according to the operation performed by the user on the operation device 22. The operation device 22 outputs the command or character, received from the user for example through the keyboard, to the control device 21.

The display device 23 includes, for example, an LCD. The display device 23 displays various types of data under the control of a controller 210 to be subsequently described.

The communication device 24 is a communication interface that transmits and receives various types of data to and from an external device inside a local area or on the internet, such as the image forming apparatus 1.

The storage device 25 is a large-capacity storage device such as an HDD or an SSD. The storage device 25 contains various control programs. In the information processing apparatus 2, a printer driver 250 and an exe file 251 are installed in the form of programs. The printer driver 250 and the exe file 251 are stored in the storage device 25. The "exe file" is application software for executing various operations for managing and executing the task, in response to the command from the task scheduler 101 of the image forming apparatus 1.

The control device 21 includes a processor, a RAM, a ROM, and an exclusive hardware circuit. The processor is, for example, a CPU, an ASIC, or an MPU.

The control device 21 acts as the controller 210 and a print spooler 211, when the processor operates according to a control program stored in the storage device 25. The control device 21 also acts as a print data generator 212, when the processor operates according to the printer driver 250 stored in the storage device 25, and as an executor 213, when the processor operates according to the exe file 251. Here, the controller 210 may be constituted in the form of a hardware circuit, instead of being realized by the operation of the control device 21 according to the control program. This also applies to other embodiments, unless otherwise specifically noted.

The controller 210 serves to control the overall operation of the information processing apparatus 2. The controller 210 is connected to the operation device 22, the display device 23, the communication device 24, and the storage device 25, and controls the operation of the mentioned components.

The print spooler 211 temporarily stores the print data in the storage device 25, and transmits the print data at an appropriate timing, to the image forming apparatus 1 via the communication device 24.

The print data generator 212 converts the document to be printed into print data that can be analyzed by the image forming apparatus 1, thereby generating the print data, and outputs the generated print data to the print spooler 211. In other words, the print data generator 212 converts the document to be printed into the description in the page description language (PDL), to generate the print data.

The executor 213 executes the operation according to the command transmitted from the task scheduler 101 of the image forming apparatus 1. For example, upon receipt of the printing command transmitted from the print task scheduler 101, the executor 213 acquires, utilizing the print spooler 211 and the print data generator 212, the storage location information, transmitted together with the printing command and indicating the storage location of the document to be printed. The executor 213 then converts the document stored in the storage location into the print data that can be analyzed by the image forming apparatus 1, and transmits the print data thus converted, to the image forming apparatus 1.

Figure 6:
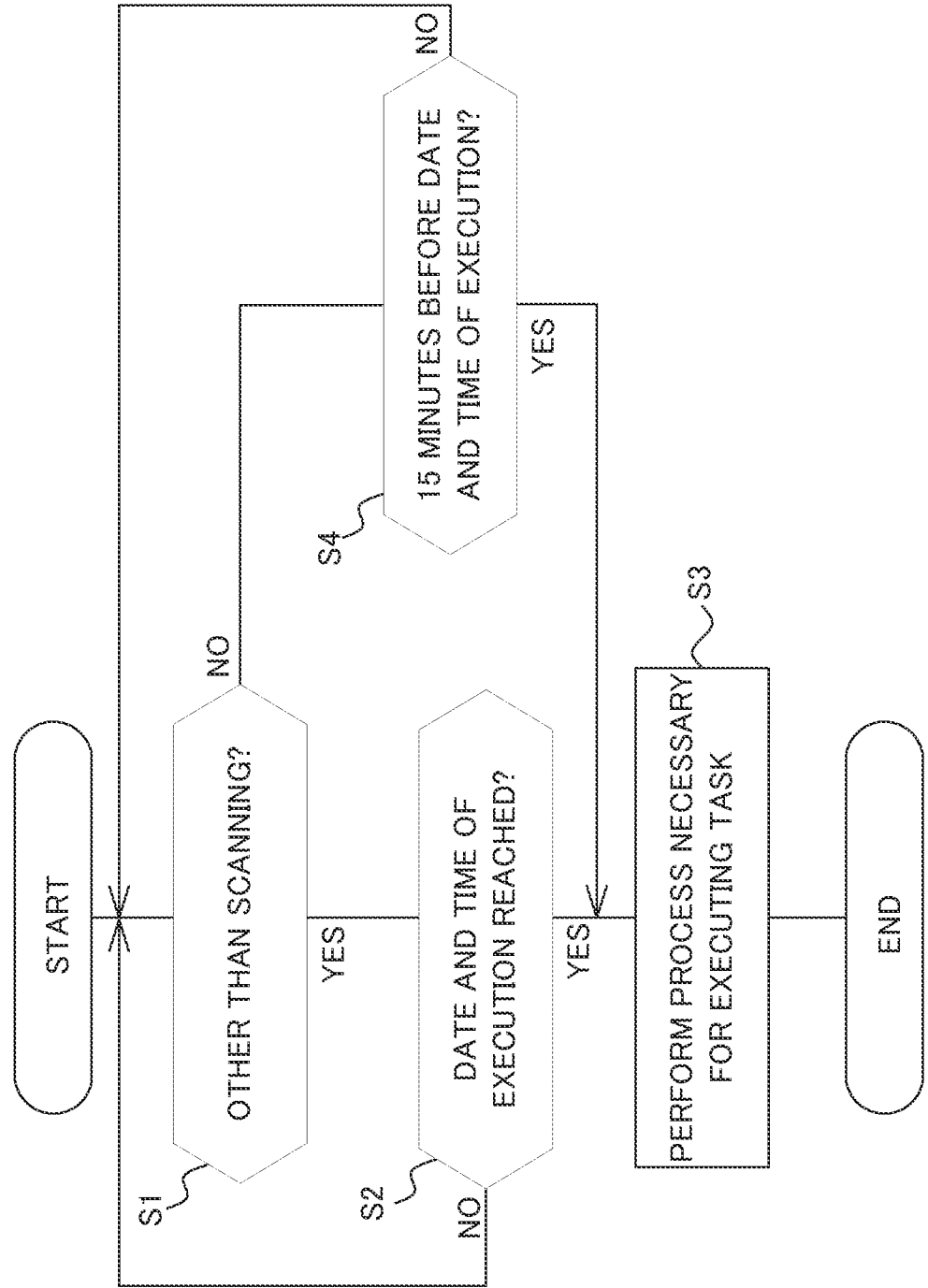
FIG. 6 is a flowchart showing a task preparation process.

Referring now to a flowchart shown in FIG. 6, a task preparation process performed by the task scheduler 101 will be described hereunder. Here, the task scheduler 101 periodically looks up each of the schedule information stored in the schedule storage region 80, to perform the task preparation process.

The task scheduler 101 decides whether the task indicated by the schedule information is a task other than the scanning task (step S1), and decides, upon deciding that the task is other than the scanning task (i.e., printing or transfer task) (YES at step S1), whether the current date and time has reached the date and time for executing the task (step S2).

Upon deciding that the current date and time has reached the date and time for executing the task (YES at step S2), the task scheduler 101 performs the predetermined process necessary for the execution of the task (step S3). After step S3, the task scheduler 101 finishes the task preparation process. In contrast, upon deciding that the date and time for executing the task has not been reached (NO at step S2), the task scheduler 101 returns to step S1.

Upon deciding at step S1 that the task indicated by the schedule information is not a task other than the scanning task (i.e., is the scanning task) (NO at step S1), the task scheduler 101 decides whether the time 15 minutes before the date and time for executing the task has been reached (step S4).

Upon deciding that the time 15 minutes before the date and time for executing the task has been reached (YES at step S4), the task scheduler 101 performs the predetermined process necessary for the execution of the task (step S3), and finishes the task preparation process. In contrast, upon deciding that the time 15 minutes before the date and time for executing the task has not been reached (NO at step S4), the task scheduler 101 returns to step S1.

Figure 7:
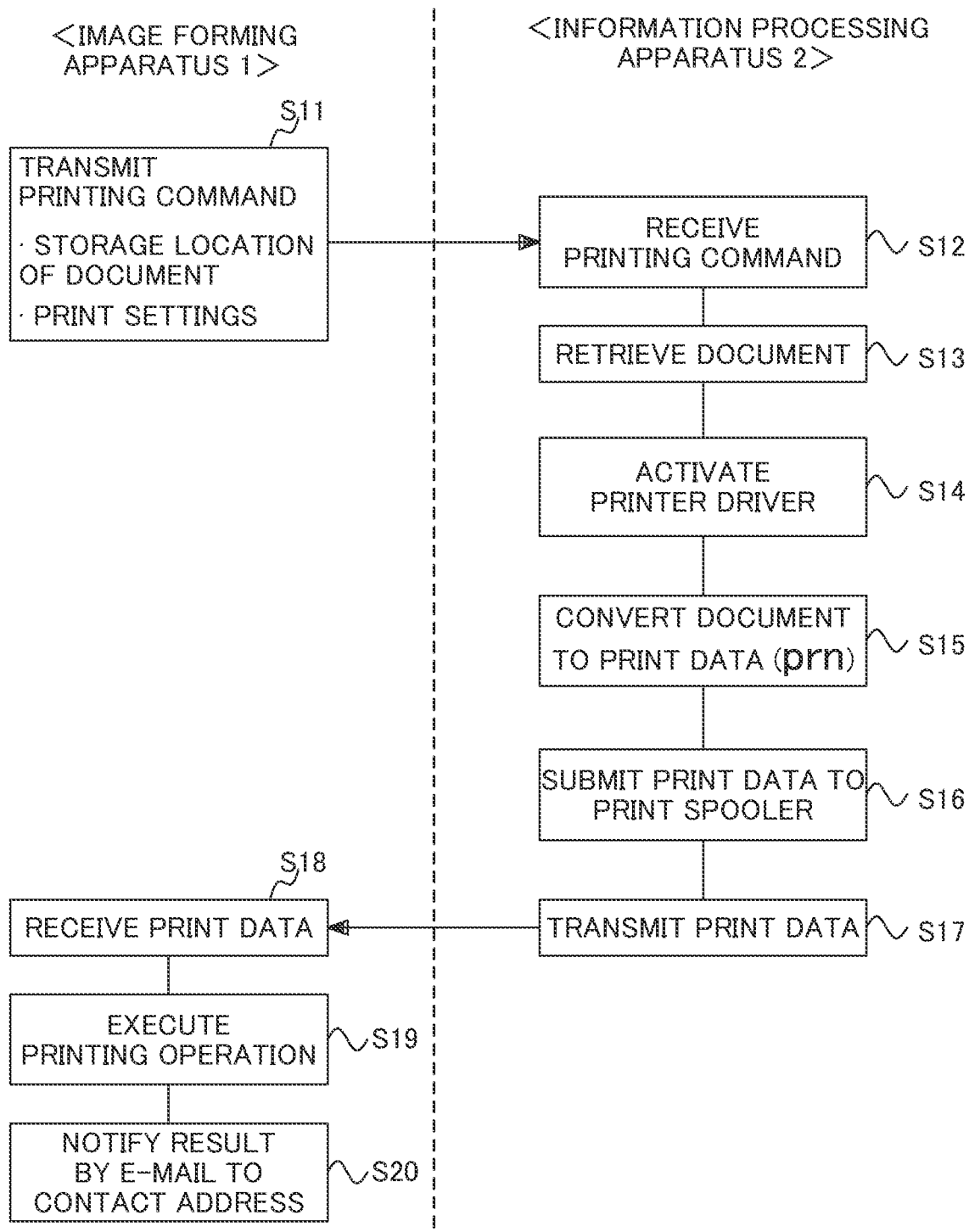
FIG. 7 is a flowchart showing a printing task execution process.

Referring to a flowchart shown in FIG. 7, a printing task executing operation, performed by the image forming apparatus 1 and the information processing apparatus 2 to execute the printing task, will be described hereunder.

Upon deciding that the date and time of startup has been reached, because the current date and time has reached the date and time for executing the printing task, the task scheduler 101 of the image forming apparatus 1 retrieves the detail information about the printing task from the schedule storage region 80, and transmits the storage location information indicating the storage location of the document to be printed and the print setting information indicating the print settings, together with the printing command, to the information processing apparatus 2 via the network I/F 91 (step S11).

Upon receipt, via the communication device 24, of the printing command transmitted from the image forming apparatus 1 (step S12), the executor 213 of the information processing apparatus 2 retrieves the document stored in the storage location indicated by the storage location information (step S13). The executor 213 activates the printer driver 250 (print data generator 212) (step S14), and converts the data of the document using the print data generator 212, according to the print settings indicated by the print setting information, thereby generating print data (prn) (step S15). The executor 213 submits the generated print data to the print spooler 211, so that the print spooler 211 temporarily stores the print data in the storage device 25 (step S16). Then the print spooler 211 transmits the print data to the image forming apparatus 1 via the communication device 24, at an appropriate timing (step S17).

Upon receipt of the print data transmitted from the information processing apparatus 2 (step S18), the controller 100 of the image forming apparatus 1 causes the image forming device 12 to execute the printing operation according to the print data received (step S19). The task scheduler 101 transmits an e-mail, with a message to the effect that the printing task has been normally finished attached thereto, to a preregistered contact address (e.g., mail address of the registerer of the printing task, stored in the schedule storage region 80 as a part of the schedule information) via the network I/F 91 (step S20). As a result, the registerer of the printing task can be notified that the printing task has been normally finished.

In the case where the printing task has not been normally finished, the task scheduler 101 transmits an e-mail, with a message to the effect that the printing task has failed attached thereto, to the preregistered contact address.

Figure 8:
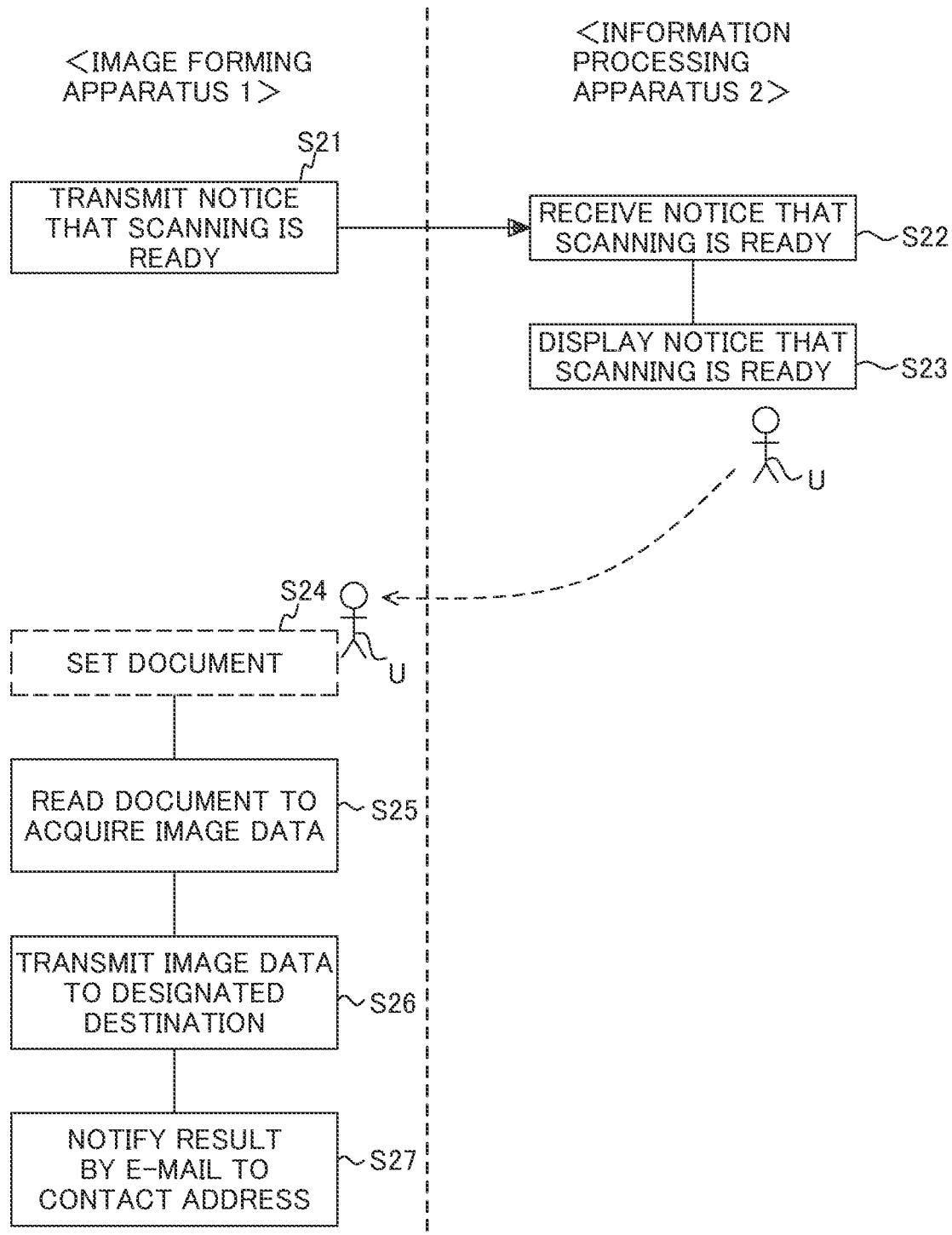
FIG. 8 is a flowchart showing a scanning task execution process.

Referring to a flowchart shown in FIG. 8, a scanning task executing operation, performed by the image forming apparatus 1 and the information processing apparatus 2 to execute the scanning task, will be described hereunder.

Upon deciding that the date and time of startup of the scanning task has been reached, because the current date and time has reached the time the predetermined time (e.g., 15 minutes) before the date and time for executing the scanning task, the task scheduler 101 of the image forming apparatus 1 retrieves the detail information about the scanning task (name of the document to be scanned and contact address) from the schedule storage region 80, and transmits an e-mail notifying that the time for executing the scanning is drawing near, with a message including the name of the document to be scanned attached, to the contact address via the, network I/F 91 (step S21).

When the predetermined contact address is the information processing apparatus 2, the executor 213 of the information processing apparatus 2 receives the e-mail (notice that the scanning is ready) transmitted from the image forming apparatus 1 (step S22), and causes the display device 23 to display the message attached to the received e-mail (step S23). As a result, the user U can be easily made aware that the time for executing the scanning is drawing near, in view of the message displayed on the display device 23. Here, although it is assumed that the information processing apparatus 2 is to receive the e-mail in the foregoing example, the e-mail may be received by a communication device other than the information processing apparatus 2, for example a mobile terminal device such as a smartphone owned by the user U.

In view of the mentioned message, the user U moves to the image forming apparatus 1, and sets the document to be scanned, on the image forming apparatus 1 (step S24). The user U inputs the instruction to execute the scanning of the document into the image forming apparatus 1, through the operation device 47 of the image forming apparatus 1.

Upon receipt of the scanning instruction from the user U through the operation device 47, the controller 100 of the image forming apparatus 1 causes the document reading device 5 to read the document, thereby acquiring the image data of the document (step S25).

The controller 100 transmits the acquired image data to a predesignated destination (e.g., information processing apparatus 2), via the network I/F 91 (step S26). The task scheduler 101 transmits an e-mail, with a message to the effect that the scanning task has been normally finished attached thereto, to the mentioned destination via the network I/F 91 (step S27). As result, the registerer of the scanning task can be notified that the scanning task has been normally finished.

In the case where the scanning task has not been normally finished, the task scheduler 101 transmits an e-mail, with a message to the effect that the scanning task has failed attached thereto, to the preregistered contact address.

Figure 9:
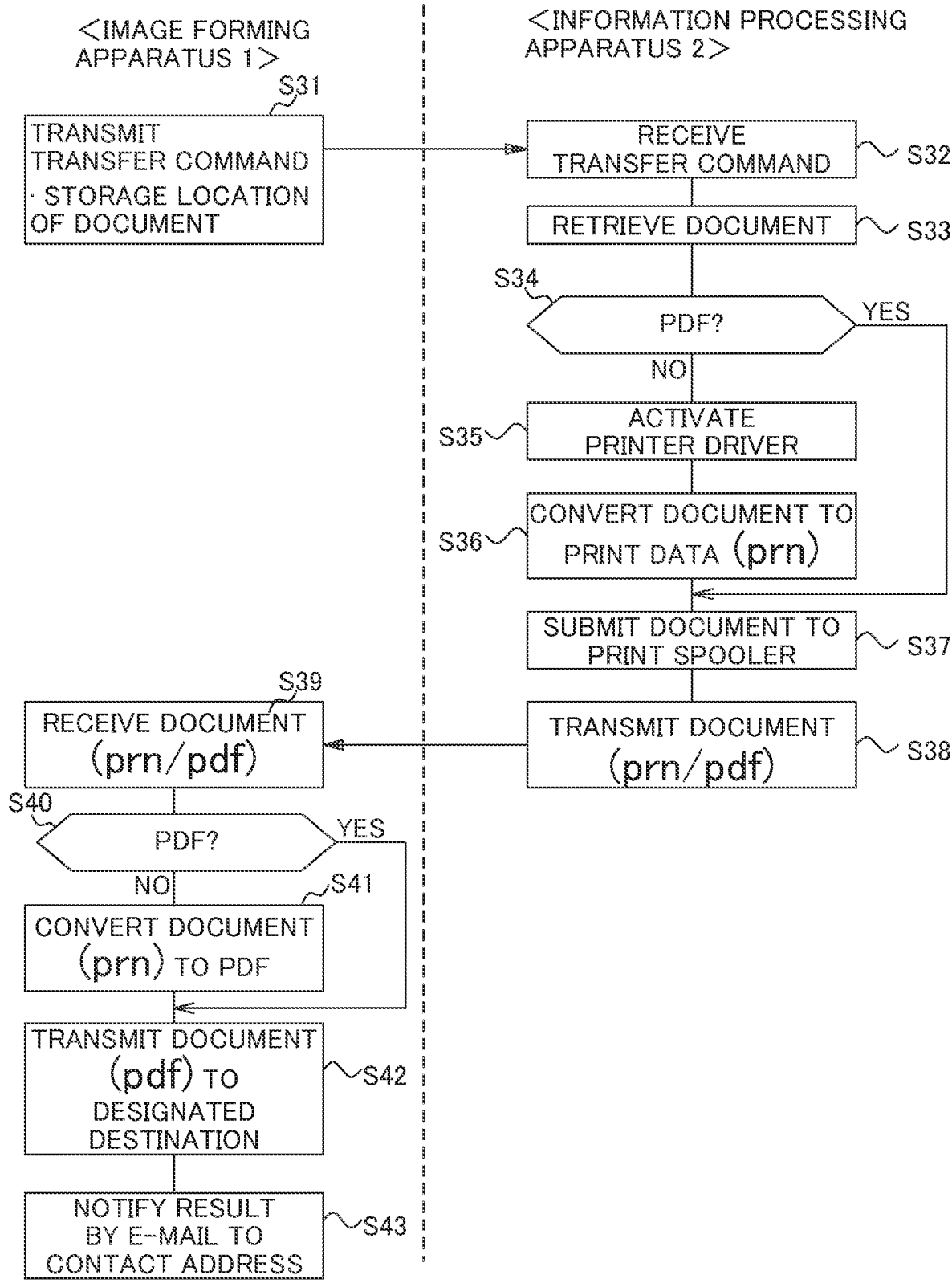
FIG. 9 is a flowchart showing a transfer task execution process.

Referring to a flowchart shown in FIG. 9, a transfer task executing operation, performed by the image forming apparatus 1 and the information processing apparatus 2 to execute the transfer task, will be described hereunder. The following example represents the case where the document is transferred to a transfer destination, in the form of data compatible with predetermined software (e.g., data of PDF format which is highly versatile).

Upon deciding that the date and time of startup has been reached, because the current date and time has reached the date and time for executing the transfer task, the task scheduler 101 of the image forming apparatus 1 retrieves the detail information about the transfer task from the schedule storage region 80, and transmits the storage location information indicating the storage location of the document to be transferred, together with the transfer command, to the information processing apparatus 2 via the network I/F 91 (step S31).

Upon receipt of the transfer command transmitted from the image forming apparatus 1 (step S32), the executor 213 of the information processing apparatus 2 retrieves the document stored in the storage location indicated by the storage location information (step S33), and decides whether the document to be transferred is the data of the PDF format (step S34).

Upon deciding that the document to be transferred is not constituted of data of the PDF format (NO at step S34), the executor 213 activates the printer driver 250 (print data generator 212) (step S35), and converts the data of the document to be transferred using the print data generator 212, thereby generating the print data (prn) (step S36). The executor 213 submits the generated print data (that can be analyzed by the image forming apparatus 1) to the print spooler 211, so that the print spooler 211 temporarily stores the print data in the storage device 25 (step S37).

Upon deciding, in contrast, that the document to be transferred is constituted of the data of the PDF format (YES at step S34), the executor 213 submits the document to be transferred to the print spooler 211 as it is, so that the print spooler 211 temporarily stores the print data in the storage device 25 (step S37). Then the print spooler 211 transmits the document (prn/pdf) to the image forming apparatus 1 via the communication device 24, at an appropriate timing (step S38).

Upon receipt of the document to be transferred transmitted from the information processing apparatus 2 (step S39), the controller 100 of the image forming apparatus 1 decides whether the document to be transferred that has been received is of the PDF format (step S40).

Upon deciding that the document to be transferred is not of the PDF format (NO at step S40), the controller 100 converts the document to be transferred into the data of the PDF format (step S41), and transmits an e-mail, with the document to be transferred, converted into the data of the PDF format, attached thereto, to the predetermined transfer destination via the network I/F 91 (step S42).

Upon deciding, in contrast, that the document to be transferred is constituted of the data of the PDF format (YES at step S40), the controller 100 transmits an e-mail, with the document to be transferred attached thereto as it is, to the predetermined transfer destination via the network I/F 91 (step S42). The task scheduler 101 transmits an e-mail, with a message to the effect that the transfer task has been normally finished attached thereto, to the preregistered contact address (e.g., mail address of the registerer of the transfer task, stored in the schedule storage region 80 as a part of the schedule information) via the network I/F 91 (step S43).

In the case where the transfer task has not been normally finished, the task scheduler 101 transmits an e-mail, with a message to the effect that the transfer task has failed attached thereto, to the preregistered contact address.

Now, there may be cases where a document stored in the information processing apparatus, such as a PC, has to be printed at a designated date and time. For example, when the document representing a paystub is to be printed at a designated date and time (e.g., 8 AM of the pay day), the user has to operate the PC to open the document at the designated date and time, and perform some works, such as activating the printer driver.

However, such work is troublesome. Besides, in the case where the user forgets the date and time to print, the necessary printed material is unable to be obtained when it is needed.

The aforementioned first and second techniques are intended to manage the schedule of the print job or facsimile transmission job. To utilize those techniques, the user has to transmit the document to be outputted in advance, to the output device such as a printer. In other words, the user has to prepare the document, well in advance of the scheduled date and time of outputting, which impedes the user from efficiently using the time. Consequently, those techniques lack in user-friendliness.

According to the foregoing embodiment, in contrast, the management of the task schedule for the information processing apparatus 2, such as a PC, is performed by the multifunction peripheral (image forming apparatus 1), and therefore the task to be executed in collaboration with the information processing apparatus 2 can be smoothly executed. Consequently, the process for executing the task at a predetermined timing can be efficiently executed, through the collaboration of a plurality of apparatuses. For example, in the case of executing the printing task, including printing the document stored in the information processing apparatus 2, the works that the user has to carry out according to the first and second techniques, such as opening the document to be printed and activating the printer driver, can be skipped.

In addition, in the case of the schedule management according to the first and second techniques, the user has to prepare and transmit the document to the image forming apparatus 1, acting as the output apparatus, in advance of the date and time for executing the task. However, the arrangement according to the foregoing embodiment eliminates the need to transmit the document in advance to the image forming apparatus 1. Therefore, it suffices that the user prepares the document by the time immediately before the date and time for executing the task, and the user can make the most of the working time.

Figure 10:
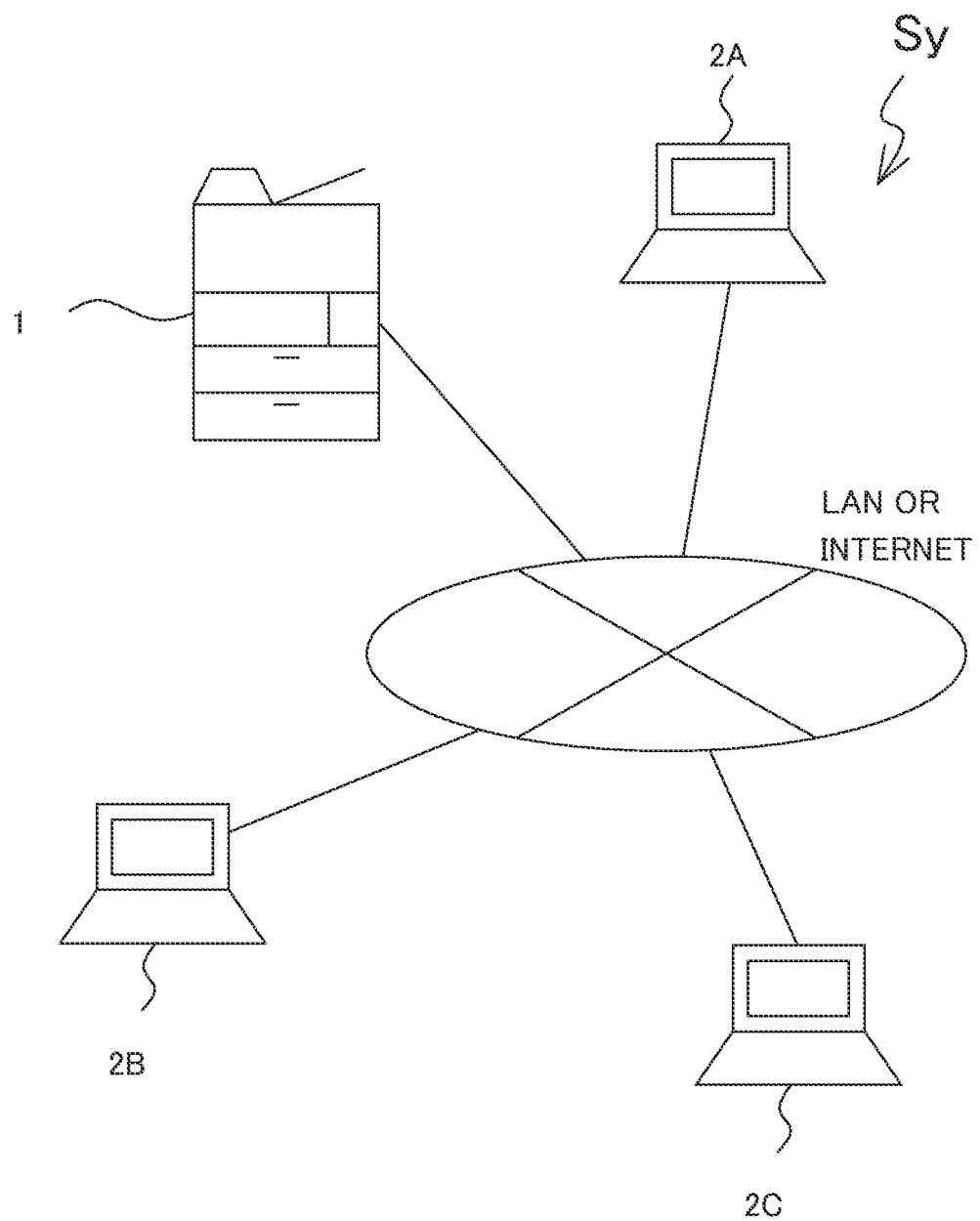
FIG. 10 is a schematic diagram showing a general configuration of a schedule coordination system according to another embodiment.

Although the image forming apparatus 1, exemplifying the multifunction peripheral, and the information processing apparatus 2 are set to work on a one-to-one basis in the foregoing embodiment, the disclosure is not limited to such embodiment. For example, the image forming apparatus 1 and a plurality of information processing apparatuses 2 may constitute the system as another embodiment, as shown in FIG. 10. In this case, the image forming apparatus 1 serves to manage the task schedule of the plurality of information processing apparatuses 2A to 2C.

Figure 11:
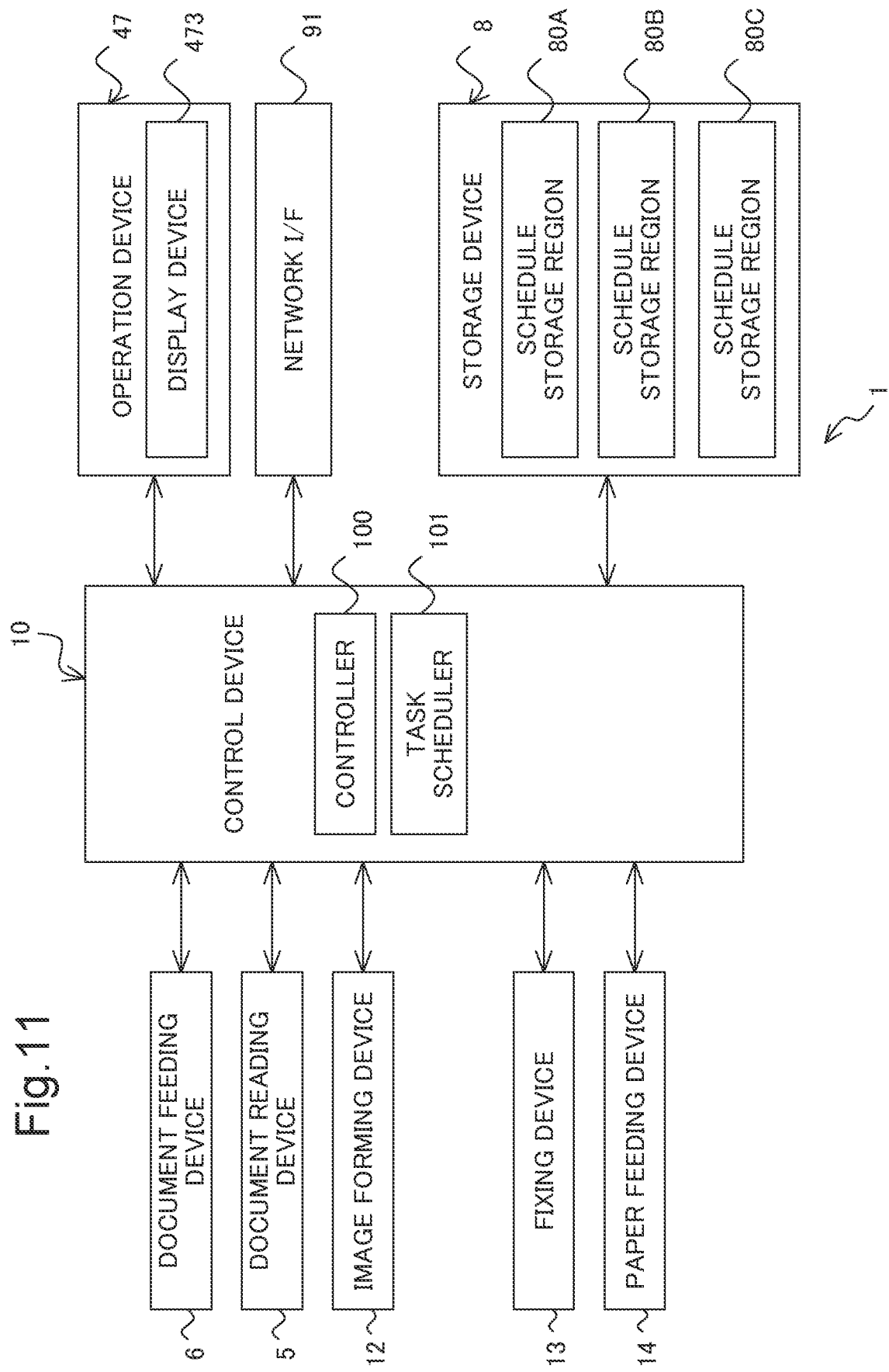
FIG. 11 is a functional block diagram showing an essential internal configuration of an image forming apparatus according to another embodiment.

FIG. 11 is a functional block diagram showing an essential internal configuration of an image forming apparatus according to another embodiment. The storage device 8 includes a plurality of schedule storage regions 80A to 80C. In the schedule storage region 80A, the schedule information about the task to be executed in collaboration with the exe file 251 installed in the information processing apparatus 2A, is stored. In the schedule storage region 80B, the schedule information about the task to be executed in collaboration with the exe file 251 installed in the information processing apparatus 2B, is stored. In the schedule storage region 80C, the schedule information about the task to be executed in collaboration with the exe file 251 installed in the information processing apparatus 2C, is stored. The task scheduler 101 performs the process necessary for executing the task in collaboration with the information processing apparatuses 2A to 2C, according to the schedule information about the task stored in each of the information processing apparatuses.

The disclosure may be modified in various manners, without limitation to the configuration according to the foregoing embodiments. For example, the disclosure may be applied to a different type of electronic apparatus having the copying function, the printing function, the scanning function, or the facsimile function, without limitation to the multifunction peripheral.

The configurations and processings according to the foregoing embodiment, described with reference to FIG. 1 to FIG. 11, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:
1. A schedule coordination system comprising:
a multifunction peripheral; and
an information processing apparatus, wherein
the multifunction peripheral including:
a first communication interface that communicates with the information processing apparatus via a network;

a storage device in which schedule information, indicating a task designated by a user, and a date and time that the task is to be executed, is stored; and
a first control device including a processor, and configured to act, when the processor executes a control program, as:
a task scheduler that decides whether a current date and time has reached a predetermined date and time of startup, on a basis of the schedule information stored in the storage device, and performs, upon deciding that the current date and time has reached the date and time of startup, a predetermined process necessary for executing the task indicated by the schedule information; and
a controller that executes the task indicated by the schedule information, and
the information processing apparatus including:
a second communication interface that communicates with the multifunction peripheral, via the network; and
a second control device including a processor, and configured to act, when the processor executes a control program, as an executor that executes an operation according to a command transmitted from the task scheduler via the first communication interface,
wherein the multifunction peripheral further includes an image forming device that forms an image on a recording medium,
the task scheduler of the multifunction peripheral decides that the date and time of startup has been reached, when the current date and time has reached the date and time for executing a printing task, and performs the predetermined process necessary for executing the printing task, by transmitting a printing command and storage location information, indicating a storage location of a document stored in the information processing apparatus, to the information processing apparatus via the first communication interface,
the executor of the information processing apparatus converts the document stored in the storage location indicated by the storage location information into print data that can be analyzed by the multifunction peripheral, upon receipt of the printing command via the second communication interface, and transmits the print data to the multifunction peripheral via the second communication interface, and
the controller of the multifunction peripheral causes the image forming device to form an image based on the print data, upon receipt of the print data transmitted from the information processing apparatus, via the first communication interface.

2. The schedule coordination system according to claim 1, wherein the printing task stored in the storage device of the multifunction peripheral includes a print setting designated by the user,
the task scheduler of the multifunction peripheral transmits information indicating the print setting, together with the printing command, to the information processing apparatus via the first communication interface, and
the executor of the information processing apparatus converts the document into the print data according to the print setting indicated by the information, upon receipt of the printing command and the information via the second communication interface.

3. A schedule coordination system comprising:
a multifunction peripheral; and
an information processing apparatus, wherein
the multifunction peripheral including:
a first communication interface that communicates with the information processing apparatus via a network;
a storage device in which schedule information, indicating a task designated by a user, and a date and time that the task is to be executed, is stored; and
a first control device including a processor, and configured to act, when the processor executes a control program, as:
a task scheduler that decides whether a current date and time has reached a predetermined date and time of startup, on a basis of the schedule information stored in the storage device, and performs, upon deciding that the current date and time has reached the date and time of startup, a predetermined process necessary for executing the task indicated by the schedule information; and
a controller that executes the task indicated by the schedule information, and
the information processing apparatus including:
a second communication interface that communicates with the multifunction peripheral, via the network; and
a second control device including a processor, and configured to act, when the processor executes a control program, as an executor that executes an operation according to a command transmitted from the task scheduler via the first communication interface,
wherein the task scheduler of the multifunction peripheral decides that the date and time of startup has been reached, when the current date and time has reached the date and time for executing a transfer task, and performs the predetermined process necessary for executing the transfer task, by transmitting a transfer command and storage location information, indicating a storage location of a document stored in the information processing apparatus, to the information processing apparatus via the first communication interface,
the executor of the information processing apparatus transmits the document stored in the storage location indicated by the storage location information, to the multifunction peripheral via the second communication interface, upon receipt of the transfer command via the second communication interface, and
the controller of the multifunction peripheral transmits the document to a predetermined transfer destination via the first communication interface, upon receipt of the document transmitted from the information processing apparatus, via the first communication interface.

4. The schedule coordination system according to claim 3, wherein the multifunction peripheral further includes an image forming device that forms an image on a recording medium,
the executor of the information processing apparatus is configured to:
decide whether the document stored in the storage location indicated by the storage location information is constituted of data compatible with predetermined software, upon receipt of the transfer command via the second communication interface;
transmit the document to the multifunction peripheral via the second communication interface, when the document is constituted of the compatible data; and
convert the document into print data that can be analyzed by the multifunction peripheral, and transmit the print data to the multifunction peripheral via the second communication interface, when the document is not constituted of the compatible data, and the controller of the multifunction peripheral is configured to:

transmit the document to the predetermined destination via the first communication interface, when the document is received via the second communication interface; and convert the print data into the compatible data, and transmit the compatible data acquired through the conversion to the predetermined destination via the first communication interface, when the print data is received via the second communication interface.

5. A schedule coordination system comprising:

a multifunction peripheral; and an information processing apparatus, wherein the multifunction peripheral including:
- a first communication interface that communicates with the information processing apparatus via a network;
- a storage device in which schedule information, indicating a task designated by a user, and a date and time that the task is to be executed, is stored; and
- a first control device including a processor, and configured to act, when the processor executes a control program, as:
  - a task scheduler that decides whether a current date and time has reached a predetermined date and time of startup, on a basis of the schedule information stored in the storage device, and performs, upon deciding that the current date and time has reached the date and time of startup, a predetermined process necessary for executing the task indicated by the schedule information; and
  - a controller that executes the task indicated by the schedule information, and the information processing apparatus including:
- a second communication interface that communicates with the multifunction peripheral, via the network; and
- a second control device including a processor, and configured to act, when the processor executes a control program, as an executor that executes an operation according to a command transmitted from the task scheduler via the first communication interface, wherein the multifunction peripheral further includes a document reading device that performs a scanning operation including reading an image of a source document, and the task scheduler of the multifunction peripheral decides that the date and time of startup has been reached, when the current date and time has reached a time a predetermined time before the date and time for executing the scanning task, and performs the predetermined process necessary for executing the scanning task, by notifying the user that the time for executing the scanning task is drawing near, wherein the information processing apparatus further includes a display device, the task scheduler of the multifunction peripheral performs the predetermined process necessary for executing the scanning task, by transmitting a predetermined notice that the scanning is ready to the information processing apparatus via the first communication interface, and the executor of the information processing apparatus causes the display device to display a message indicating that the time for executing the scanning task is drawing near, upon receipt of the notice that the scanning is ready, via the second communication interface.

* * * * *